Sept. 3, 1957  A. W. NOON  2,804,974
AUTOMATIC SEPARATING SYSTEM
Filed Feb. 1, 1954  3 Sheets-Sheet 1
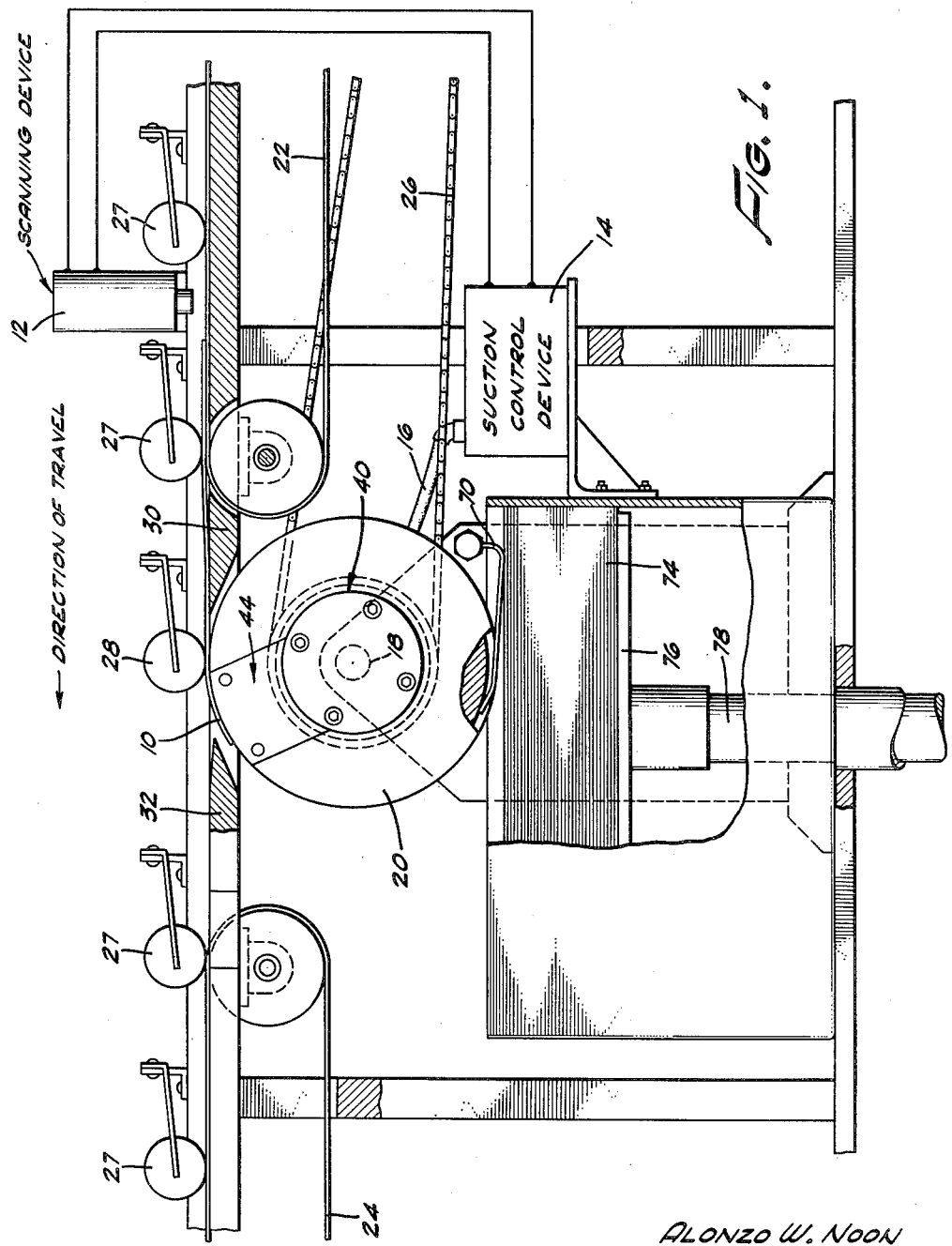
ALONZO W. NOON
INVENTOR.
BY *Lyon & Lyon*
ATTORNEYS

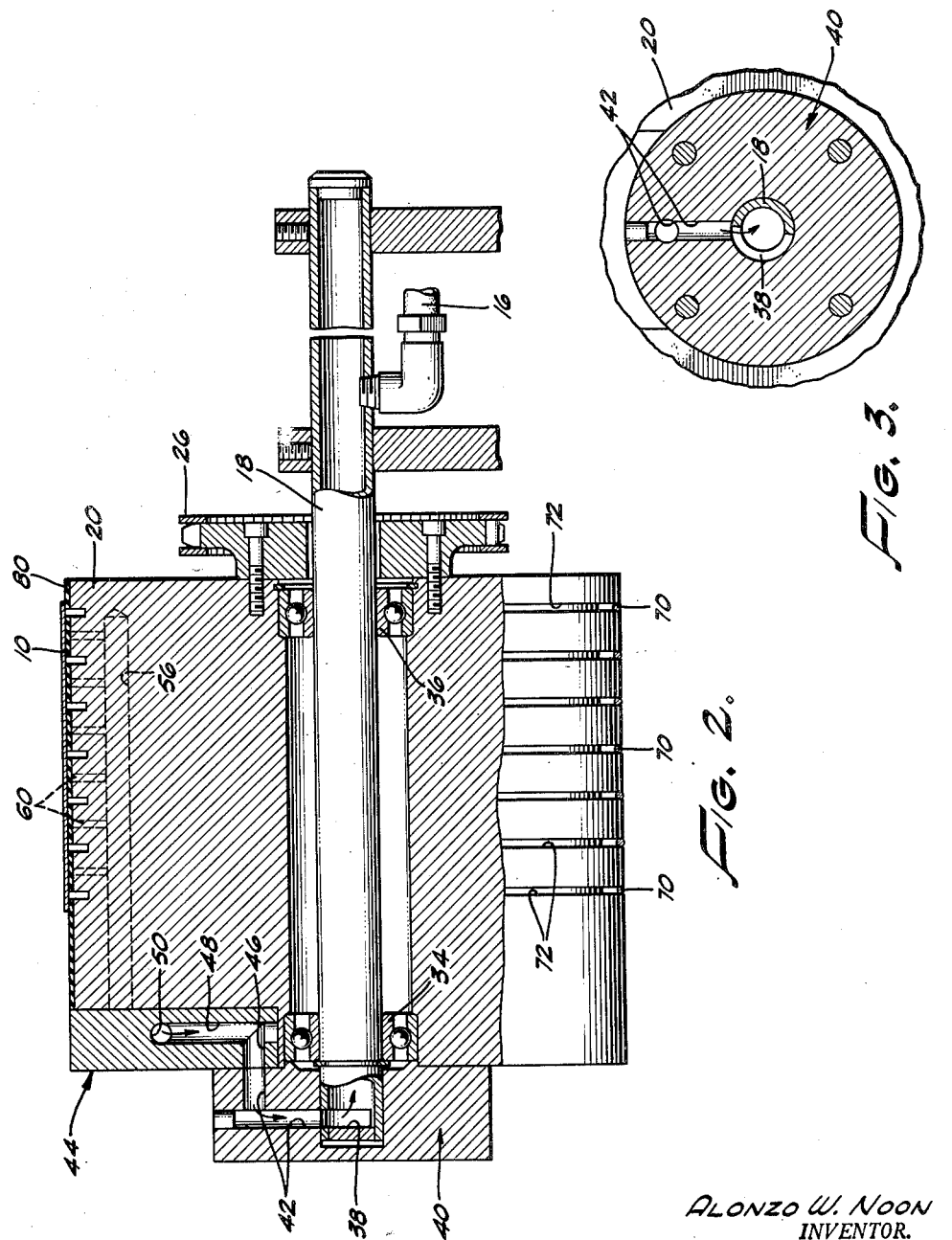

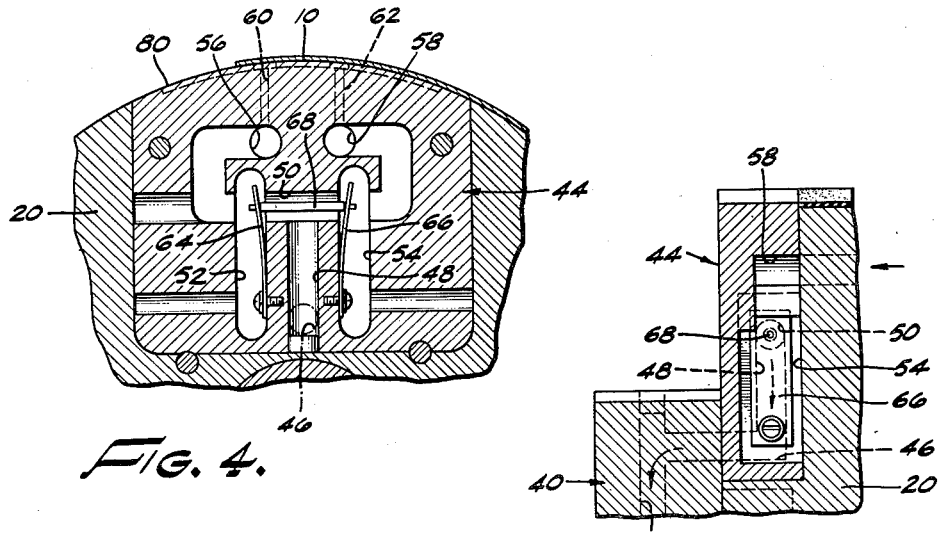
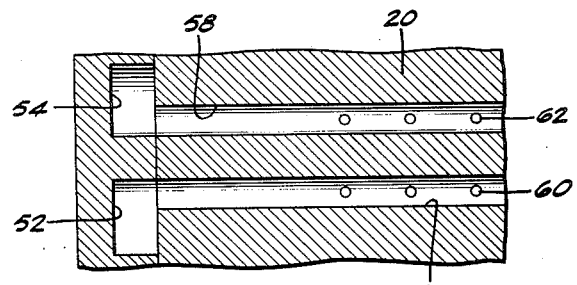
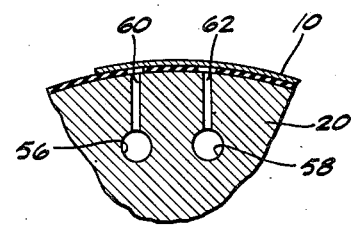
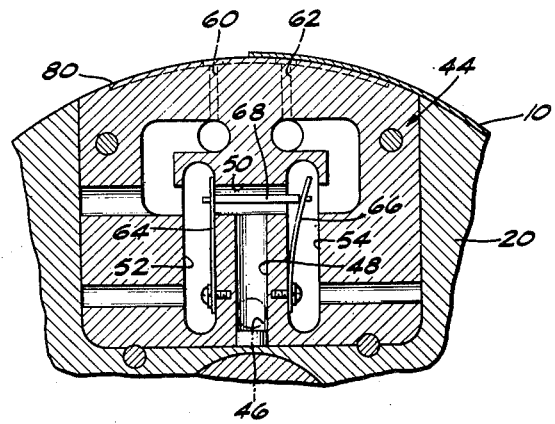

United States Patent Office 2,804,974
Patented Sept. 3, 1957

2,804,974

AUTOMATIC SEPARATING SYSTEM

Alonzo W. Noon, Los Altos, Calif.

Application February 1, 1954, Serial No. 407,347

10 Claims. (Cl. 209—74)

This invention relates to apparatus for sorting sheets of flexible material, such as cards, checks, and the like. In application filed November 9, 1953, Serial Number 390,897, by Alonzo W. Noon, there is described an Automatic Separating System. In this application, there is described apparatus capable of separating single sheets of flexible material from a stack of these sheets and precisely aligning them at spaced intervals by one of their edges and then carrying them to subsequent apparatus for inspection or sorting, in accordance with desired characteristics for these flexible sheets. Conveyor belts are used to carry the sheets. To inspect and sort these sheets or cards, it is required to convey them past inspection apparatus to a number of different stations, where they are sorted out at each station in accordance with a desired marking or characteristic.

A feature of this invention is the provision of apparatus which is present at each station and which is capable of selectively removing and stacking identified sheets or cards at each station from a conveyor carrying a plurality of them past that station.

Another feature of this invention is the provision of apparatus positioned at a desired station which can quickly and efficiently select, carry, and stack an identified card without marring it.

Still another feature of this invention is the provision of a drum and valve apparatus which is novel and useful and can selectively remove identified cards from a conveyor belt whereon they are being conveyed and which can stack these cards in the sequence of removal.

These and other features of the invention are achieved by providing a drum mounted rotatably on a hollow shaft. The drum is provided with valve apparatus which communicates with the hollow shaft over a desired arc of drum rotation. The drum also has passages therein communicating with openings in its periphery. A novel valve apparatus is provided in the drum, whereby when one of two sets of openings in the drum periphery is covered, passage from the hollow shaft to the other set of openings is prevented. The drum is positioned between two conveyor belts so that the cards on one of the conveyor belts passes over the drum to the other of the conveyor belts. (Suction is applied to the hollow shaft when it is desired to select a card or check and prevent its being passed to the subsequent conveyor belt.) The application of suction causes the card on the drum at the time to be held and carried through the predetermined arc of the slot in the shaft to a stack of such cards where the card is released. If the suction is not applied, a card on the drum is carried through a short distance to the next conveyor belt, which carries it to the next station, at which another selecting drum is provided.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 1 is a drawing of an embodiment of the invention located at a station;

Figure 2 is a cross-section of the gating and stacking drum shown in Figure 1;

Figure 3 is a section through a main valve body shown in Figure 2;

Figure 4 is a section of a selector valve shown in Figure 2;

Figure 5 is a transverse section of the selector valve shown in Figure 4;

Figure 6 shows two passages in the periphery of the drum in a section taken through the drum shown in Figure 2.

Figure 7 is another sectional view of the periphery of the drum shown in Figure 2 showing the two passages communicating with the sets of openings on the periphery of the drum; and Figure 8 is a sectional view of the selector valve as in Figure 4, which shows operation of the leaf springs.

Reference is now made to Figure 1, which shows an embodiment of the invention positioned at a selecting station. Apparatus of the type previously described in the application mentioned above is employed to convey flexible sheets, such as cards, papers, or checks and the like, to a sorting station of the type shown in Figure 1. These cards are aligned so that identification which they bear may be scanned by scanning apparatus to determine at which station a particular card should be deposited. The means used for card identification may be of any well known type, such as color, a pattern of perforations, or ink or magnetic markings laid down in a particular code. The scanning device may be, for example, photoelectric or magnetic sensing and should be capable of identifying a card bearing the desired characteristic and providing a signal which can operate a suction control device.

As a card 10 is carried forward past the scanning device 12, the scanning device, if the card bears the marking indicating it is to be selected, can provide an electrical output signal indicative of the fact that the card is the one desired at the next station. A suction control device 14 is represented by a rectangle in Figure 1. This may consist of, for example, a valve, which is solenoid operated. Accordingly, when the scanning device 12 identifies a card, its output is applied to excite the solenoid in the suction control device 14. This permits suction, or a vacuum, to be applied from a source (not shown) to a pipe 16 which communicates with a hollow shaft 18 upon which is rotatably mounted a drum 20. The drum is positioned so that its periphery is interposed between two conveyor belts 22, 24.

A card, which is not sought to be held at a station, is carried by the first belt 22 on to the drum 20 which carries the card to a second belt 24 which conveys it to a subsequent station. The drum is rotated by a drive chain 26 which keeps its peripheral speed in synchronism with that of the conveyor belts. The driving power source (not shown) may be the same for both the drum and the conveyors. There are idler wheels 27 provided over the conveyor belts to maintain the flexible sheets pressed down flat against same. An idler wheel 28 is also provided to ride on the periphery of the drum, and it also assists in maintaining a card or flexible sheet pressed against the periphery of the drum. In order to assure that cards or sheets of paper go from conveyor to drum to conveyor with a minimum of difficulty, extensions 30, 32 are provided which are between the ends of the belts and the drum. These extensions are made sufficiently short, so that a sheet can reach under the idler wheel on the drum and still be urged forward by the conveyor belt. These extensions are shaped so that there is a minimum of space between them, the conveyor, and the drum, to prevent a sheet from jamming between conveyor belt and extension, or drum and extension. The extension on the far side of the drum, however, is spaced to permit a selected card or sheet to pass between it and the drum. It is not too far from the drum so that the stiffness of nonselected cards or sheets permit them to bridge the gap between drum and extension. When the scanning device provides an output indicative that the card passing thereunder is to be held at the next station, this is communicated to actuate the suction control device. Suction is applied for a desired interval to the pipe leading from the device to the hollow shaft of the drum.

Referring to Figure 2, the drum is shown as mounted on bearings 34, 36 on the hollow shaft 18. The shaft has a slot 38 therein which extends over a desired arc. The length of the arc over which it extends is substantially the distance between the top and bottom of the drum shown in Figure 1. A main valve body 40 shown in section in Figure 3 has a passage 42 therein which communicates with the slot in the hollow shaft. The main valve is fastened to the drum body and rotates therewith. Accordingly, the suction in the shaft 18 is applied through the passages 42 in the main valve body through approximately 180° of rotation of the drum.

The right-angle passage 42 through the main valve body communicates with a port 46 in a selector valve 44 which is shown in section in Figures 4, 5, and 8. This selector valve is mounted in a section of the drum and is rotatable therewith. The port 46 in the selector valve communicates with a passage 48 which, in turn, communicates with a transverse passage 50. This transverse passage has two slots 52, 54 transverse thereto, which are positioned on either side of the point of communication of the passage 48 from the port 46 with the transverse passage 50. The transverse passage 50 communicates at its two ends with two passageways 56, 58 which are in the drum and lead to two sets of openings 60, 62 in the drum periphery. These may better be seen by reference to Figures 6 and 7. The two slots and transverse passageway are milled in the portion of the selector valve body which is against the side of the drum. Two leaf springs 64, 66 are shown which have one end fastened to the wall of each transverse slot 52, 54 in a manner to be urged toward the point of communication of the passage with the transverse passage, thereby to seal off the passage of air from the passage to the transverse passage. The two leaf springs, however, are held apart by a connector link 68. Accordingly, the usual position of the leaf springs is as shown in Figure 4. The ends of the leaf springs are long enough and wide enough to extend past the transverse passage and block it if permitted.

When the suction control device is operated to permit application of suction to the hollow shaft, this suction is communicated through the main valve 40 and selector valve 44 to the two passageways communicating with the two sets of openings 60, 62 on the drum periphery. In view of the slot 38 in the hollow shaft, the suction is not applied except through the arc made by the drum between the idler wheel 28 at its top and pickoff fingers 70 shown in Figure 1, which rest in circumferentially extending grooves 72 in the surface of the drum (shown in Figure 2). The drum rotation is maintained by means of the drive chain 26 so that one or the other of the openings in its periphery will be covered by a card 10 which actuates the scanning device. In other words, the timing is such that when the leading edge of a desired card reaches the drum the holes in its periphery have suction applied thereto. This causes the card-leading edge to adhere to the drum surface as shown in Figure 1, so that instead of the card being carried on to the next conveyor belt, it is pulled downward. When the sheet reaches the underside of the drum, the suction is cut off by virtue of the slot in the hollow shaft being terminated. Furthermore, the suction control device is timed to be made inactive at a time when the drum travels just beyond this point. To assist in removing the card from the drum, the separating fingers 70 are employed. They extend into grooves on the drum periphery and serve to direct the card downward and in the direction of its motion. The card, accordingly, is slid on to a stack of cards 74 underneath the drum, which were removed previously. The stack may rest on a platform 76 with a mechanism 78 which successively lowers as the weight of the stack increases, in order to permit a large number of sheets or cards to be piled up.

In operation, the peripheral speed of the drum is maintained substantially the same as the surface speed of the drive belts which move the cards along. Also, the timing of the rotation of the drum is maintained so that as the card arrives in the proper position the one or the other of the sets of suction holes always come in contact with the card. The separating fingers are positioned to assure that the card being selected for stacking will leave the drum at the proper time.

Considering, again, the selector valve shown in Figures 4, 5, and 6, when the openings in the periphery of the drum are unsealed, suction is applied to the transverse slot in the valve and past both leaf springs to both sets of openings in the periphery of the drum. However, should one set of openings become closed by a card being selected, air leakage through the remaining openings can become sufficiently large to reduce the gripping action of the other row. When one set of holes is covered, there is no air flow into the passageway communicating with the covered hole—therefore, no flow past the leaf spring in that passageway. However, there is air flow into the passage communicating with the uncovered holes and, therefore, past the leaf spring which is extending into that passageway. An unbalanced force now exists which moves the leaf spring assembly in a direction so that the opening communicating with the passageway through which air is now flowing is closed. This is shown in Figure 8. Flow of air to the set of openings in the drum periphery which are not covered is then cut off, and all the suction is applied to the card which is sealing the other set of openings. When the suction is discontinued and the card is removed from the drum, the leaf springs resume their normally inactive position whereby both openings communicating with the transverse passage in the selector valve are open to air suction. Therefore, the selector valve operates to automatically prevent the application of suction to one set of openings when the other set is covered by a card or sheet. This insures that the card is positively held by the other set of openings.

In order to permit a better seal between a selected card and the surface of a drum, the area of the drum surface around the openings may have rubber 80 or some other desirable material with rubber-like characteristics applied thereto. The apparatus has been shown as being positioned between two conveyor belts. This is not to be construed as a limitation, since any conveyor system which permits the drum to be brought in contact with cards which it is desired to pass on, or to select and stack, as the result of the operation of a scanning system, may be employed herein. It should be apparent that the selected sheets are stacked in the order of their selection. Furthermore, they are not marred or defaced by this type of handling. A scanning device need not be position at each station, but may be centrally located and provided with suitable circuitry to actuate the selecting drums at each station at the proper time.

There has been shown and described novel and useful apparatus for rapidly separating identified sheets of flexible material such as paper or cards from other sheets which are being conveyed by a station at which this apparatus is positioned and stacking them in the order of their selection.

I claim:

1. Selection apparatus comprising a rotatably mounted drum, at least two passages in said drum, two openings in said drum periphery respectively communicating with said two passages, means to selectively apply suction to said two passages as said drum rotate through a desired arc, and mean to cut off the suction applied to one passage when the opening with which said other passage communicates is covered.

2. Selection apparatus comprising a rotatably mounted drum, at least two passages in said drum, two openings in said drum periphery respectively communicating with said two passages, means to apply suction through said two passages as said drum rotates through a desired arc including a hollow shaft on which said drum is rotatably mounted, a slot in said shaft having said desired arc, valve means including a passageway communicating from said shaft slot to said two passages attached to and rotating with said drum, and means interposed between said passageway and said two passages to cut off the suction applied to one passage when the opening with which said other passage communicates is covered.

3. Selection apparatus as recited in claim 2 wherein said means to cut off the suction applied to one passage when the opening with which said other passage communicates is cut off includes a valve body having a single port communicating with the passageway of said first valve means, a passage communicating with said port and transverse thereto, both ends of said transverse passage communicating with said two passage in said drum, a pair of slots transverse to said transverse passage, passing therethrough and positioned on either side of the opening where said transverse passage communicates with said port, a leaf spring in each slot, each leaf spring having a sufficient width to block said transverse passage, each having one end extending across said transverse passage and each having the other end fastened to the wall of said slot to urge their one ends toward each other, and a connector link coupling said one ends of said leaf springs and holding them spaced from the walls of said slot.

4. Selection apparatus comprising a drum having two sets of axially aligned openings in its periphery and two passageways in said drum communicating with each set, a hollow shaft on which said drum is rotatably mounted, a slot in said hollow shaft wall extending over a desired arc, a first valve attached to said drum and rotatably mounted over the portion of said hollow shaft having said slot, said first valve having a passageway therethrough having one end communicating with said slot, and a second valve mounted on said drum, said second valve having a transverse passage each end of which communicates with a different one of the two passageways in said drum, a port communicating with said transverse passage between its two ends and with the other end of the passageway in said first valve, and means in said second valve to block the communication between said port and one end of said transverse passage when the set of openings with which the other end of said transverse passage communicates is covered.

5. Selection apparatus as recited in claim 4 wherein said means in said second valve to block the communication of said port with one end of said transverse passage when the set of openings with which the other end of said transverse passage communicates is covered includes, a pair of slots transverse to said transverse passage and positioned on either side of the opening where said transverse passage communicates with said port, said transverse passage passing through said slots a leaf spring in each slot, each having a sufficient width to block said transverse passage, each having one end extending across said transverse passage, and each having the other end fastened to the wall of said slot to urge their one ends toward each other, and a connector link coupling said one ends of said leaf springs and holding them spaced from the walls of said slot.

6. In a system wherein sheets of flexible material such as paper and the like are carried at spaced intervals by conveyors to a plurality of stations to be sensed at each station and selected at different stations in accordance with desired classifications for said sheets, selection apparatus at each of said stations comprising a rotatably mounted drum positioned to have its periphery receive one of said sheets from one of said conveyors and to carry it over an arc to another conveyor to the next station, two axially aligned sets of openings in said drum periphery, two passages through said drum each of which communicates with a different one of said sets of openings, means to apply suction to said two passages as said drum rotates through an arc including and greater than said carrying arc to retain a sheet at said station, and means to block the suction to one of said two passages when the set of holes with which the other of said two passages communicates is covered by one of said sheets.

7. In a system wherein sheets of flexible material such as paper and the like are carried at spaced intervals by conveyors to a plurality of stations to be sensed and then selected at different stations in accordance with desired classifications for said sheets, selection apparatus at each of said stations comprising a drum positioned to have its periphery receive a sheet from one of said conveyors and to carry it over an arc to another conveyor to the next station, two axially aligned sets of openings in said drum periphery, two passageways through said drum each of which communicates with a different one of said two sets of openings a hollow shaft on which said drum is rotatably mounted, a slot in said hollow shaft wall extending over an arc including and larger than said carrying arc, a first valve attached to said drum and rotatably mounted over the portion of said hollow shaft having said slot said first valve having a passageway therethrough having one end communicating with said slot, and a second valve mounted on said drum, said second valve having a transverse passage each end of which communicates with a different one of the two passageways in said drum, a port communicating with said transverse passage between its two ends and with the other end of the passageway in said first valve, means in said second valve to block the communication between said port and one end of said transverse passage when the set of openings with which the other end of said transverse passage communicates is covered, and means to apply suction to said hollow shaft.

8. In a system as recited in claim 7 wherein said means in said second valve to block the communication of said port with one end of said transverse passage when the set of openings with which the other end of said transverse passage communicates is covered includes, a pair of slots transverse to said transverse passage, passing therethrough and positioned on either side of the opening where said transverse passage communicates with said port, a leaf spring in each slot, each having a sufficient width to block said transverse passage, each having one end extending across said transverse passage, and each having the other end fastened to the wall of said slot to urge their one ends toward each other, and a connector link coupling said one ends of said leaf springs and holding them spaced from the walls of said slot.

9. In a system as recited in claim 7 wherein said drum has parallel grooves extending around its periphery and stationary metal fingers mounted to extend into said grooves as said drum rotates at a position at which it is desired to remove a selected sheet from a drum.

10. Valve apparatus comprising a valve body having a port on one side communicating with the center of a transverse passage on the other side, a pair of exit passages each of which communicates with a different end of said transverse slot, a pair of slots transverse to said transverse passage, passing therethrough and positioned on either side of the opening by which said transverse passage communicates with said port, a leaf spring in each slot, each leaf spring having a sufficient width to block said transverse passage, each having one end extending across said transverse passage, and each having the other end fastened to the wall of said slot to urge their one ends toward each other, and a connector link coupling said one ends of said leaf springs and holding them spaced from the walls of said slot.

References Cited in the file of this patent

UNITED STATES PATENTS

| | | |
|---|---|---|
| 1,838,200 | Tomtlund | Dec. 29, 1931 |
| 1,986,671 | Barkley | Jan. 1, 1935 |
| 2,058,979 | Henry | Oct. 27, 1936 |
| 2,384,231 | Bamford | Sept. 4, 1945 |
| 2,620,924 | Kusters | Dec. 9, 1952 |